United States Patent
Haydock et al.

(10) Patent No.: US 9,623,471 B2
(45) Date of Patent: Apr. 18, 2017

(54) FURNACE HEAT EXCHANGER ATTACHMENT

(75) Inventors: Paul M. Haydock, Zionsville, IN (US); Stephen L. Pulley, Carmel, IN (US); James J. Mitchum, New Palestine, IN (US); John A. Wade, Greenwood, IN (US); Stephen R. Carlisle, Indianapolis, IN (US)

(73) Assignee: CARRIER CORPORATION, Farmington, CT (US)

( * ) Notice: Subject to any disclaimer, the term of this patent is extended or adjusted under 35 U.S.C. 154(b) by 1019 days.

(21) Appl. No.: 13/247,490

(22) Filed: Sep. 28, 2011

(65) Prior Publication Data

US 2012/0085521 A1 Apr. 12, 2012

Related U.S. Application Data

(60) Provisional application No. 61/391,361, filed on Oct. 8, 2010.

(51) Int. Cl.
| | |
|---|---|
| *B21D 39/02* | (2006.01) |
| *B21D 53/02* | (2006.01) |
| *F28D 9/00* | (2006.01) |
| *F28F 9/16* | (2006.01) |
| *F24H 3/10* | (2006.01) |
| *F24H 8/00* | (2006.01) |
| *F24H 9/14* | (2006.01) |

(52) U.S. Cl.
CPC ............. *B21D 39/02* (2013.01); *B21D 53/02* (2013.01); *F28D 9/0031* (2013.01); *F28F 9/165* (2013.01); *F24H 3/105* (2013.01); *F24H 8/00* (2013.01); *F24H 9/146* (2013.01); *Y02B 30/102* (2013.01); *Y10T 29/4935* (2015.01)

(58) Field of Classification Search
CPC ..... F28F 9/165; F28F 9/12; F28F 9/14; F24H 3/10; F24H 8/00; F24H 9/146; F24H 3/105; B23P 11/005; B21D 39/02; B21D 53/02; F28D 9/0031; Y10T 29/4935; Y02B 30/102
USPC ................. 165/76, 173, 178; 126/119, 99 R; 285/47, 222

See application file for complete search history.

(56) References Cited

U.S. PATENT DOCUMENTS

| | | | | |
|---|---|---|---|---|
| 3,545,424 | A | * | 12/1970 | Lohman ...................... 126/91 R |
| 3,908,629 | A | * | 9/1975 | Wiese .......................... 126/119 |
| 3,940,837 | A | * | 3/1976 | Wiese ..................... 29/890.044 |
| 4,401,157 | A | * | 8/1983 | Cadars ......................... 165/173 |
| 4,663,837 | A | * | 5/1987 | Hoeffken et al. .............. 29/727 |

(Continued)

*Primary Examiner* — Tho V Duong
(74) *Attorney, Agent, or Firm* — Cantor Colburn LLP

(57) ABSTRACT

An attachment between a heat exchanger and a cell panel of a furnace includes a cell panel including a plurality of cell panel openings and a heat exchanger having a plurality of cells. Each cell has a cell outlet insertable into a cell panel opening of the plurality of cell panel openings. A compressible gasket is insertable between the cell panel openings and the cell outlets and securable therein when the heat exchanger is secured to the cell panel. A crimping tool for securing a heat exchanger cell outlet to a cell panel of a furnace includes a male portion including a split die having two die halves and a die expander configured to separate the two die halves to engage an inner surface of the cell outlet. A female portion applies a force to the cell outlet to crimp the cell outlet to the cell panel.

5 Claims, 7 Drawing Sheets

(56) References Cited

U.S. PATENT DOCUMENTS 4,896,411 A * 1/1990 Dempsey ................. 29/890.039
5,575,330 A * 11/1996 Hoeffken ...................... 165/170
5,901,784 A * 5/1999 Potier ........................... 165/173

* cited by examiner

FURNACE HEAT EXCHANGER ATTACHMENT

CROSS REFERENCE TO RELATED APPLICATION

This application claims priority to U.S. provisional application, 61/391,361, filed Oct. 8, 2010, the entire contents of which are incorporated herein by reference.

BACKGROUND OF THE INVENTION

The subject matter disclosed herein relates to furnaces. More specifically, the present disclosure relates to attachment of a heat exchanger to a cell panel of a furnace.

In a typical furnace, a fuel, for example, natural gas, is combusted in a burner. The combustion gas, flue gas, is routed through one or more heat exchangers which extract the heat therefrom. Outlets of the heat exchanger are mechanically secured to a cell panel during assembly. The individual heat exchanger cells are typically formed by stamping halves of the cells which are then secured together by a folded and crimped joint. Because of the shapes of the cells, the areas of the outlets of the cells where the cell halves mate are difficult to seal to the cell panel resulting in leakage between the heat exchanger cells and the cell panel and a corresponding loss of efficiency of the heat exchanger and furnace.

BRIEF DESCRIPTION OF THE INVENTION

According to one aspect of the invention, an attachment between a heat exchanger and a cell panel of a furnace includes a cell panel including a plurality of cell panel openings and a heat exchanger having a plurality of cells. Each cell has a cell outlet insertable into a cell panel opening of the plurality of cell panel openings. A beveled transition is included at each cell outlet extending around a perimeter thereof to improve sealing between the cell outlet and the cell panel; and A compressible gasket is insertable between the cell panel openings and the cell outlets and securable therein when the heat exchanger is secured to the cell panel thereby sealing between the heat exchanger and the cell panel.

According to another aspect of the invention, a crimping tool for securing a heat exchanger cell outlet to a cell panel of a furnace includes a male portion extending into a cell outlet and including a split die having two die halves and a die expander configured to separate the two die halves to engage an inner surface of the cell outlet. A female portion is configured to apply a force to the cell outlet to crimp the cell outlet to the cell panel.

According to yet another aspect of the invention, a method of securing a heat exchanger cell outlet to a cell panel of a furnace includes inserting the cell outlet through a cell panel opening and inserting a male portion of a crimping tool into the cell outlet. A split die of the male portion is expanded to engage and inner surface of the cell outlet and a female portion of the crimping tool is lowered to crimp the cell outlet over the cell panel opening.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
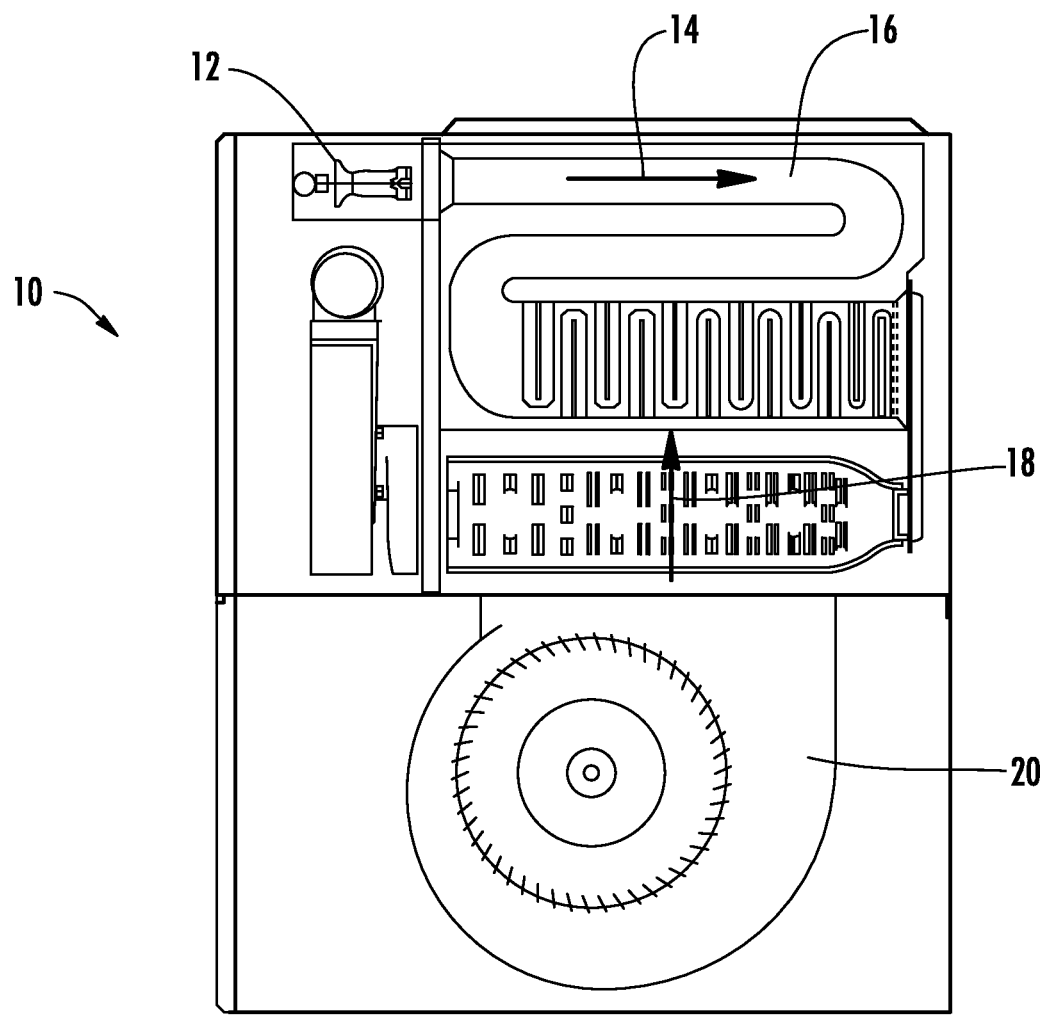
FIG. 1 is a schematic view of an embodiment of a furnace.

Shown in FIG. 1 is an embodiment of a furnace 10. The furnace 10 includes a burner 12 for combusting a fuel such as natural gas. Flue gas 14 exits the burner 12 and flows through a primary heat exchanger (PHX) 16. The PHX 16 is a gas-to-gas heat exchanger in which the flue gas 14 flowing through the PHX 16 transfers thermal energy to the surface of the PHX 16. The thermal energy is then dissipated from the surface of the PHX 16 into a flow of air 18 urged across the exterior of the PHX 16 by, for example, a blower 20.

Figure 2:
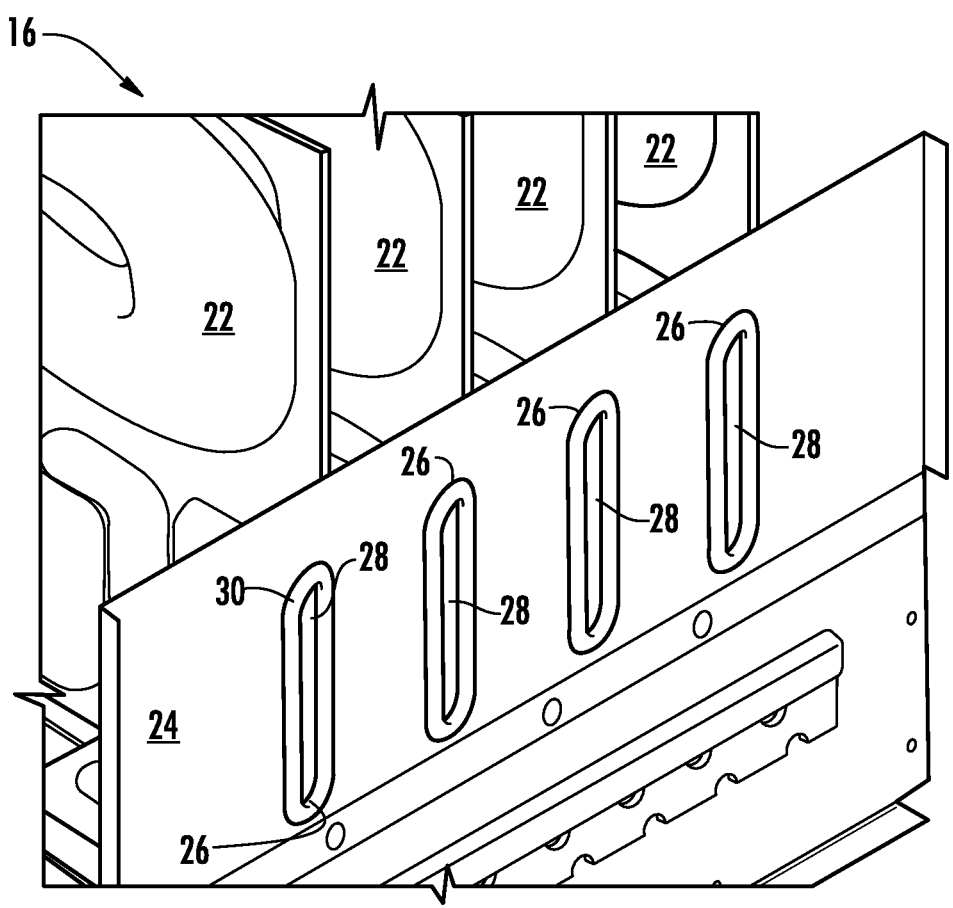
FIG. 2 is a schematic view of an embodiment of a heat exchanger and cell panel attachment.

Referring to FIG. 2, the PHX 16 includes a number of PHX cells 22. To form the PHX 16, the PHX cells 22 are arranged and secured to a cell panel 24. The cell panel 24 includes a plurality of cell panel openings 26 such that a cell outlet 28 of each PHX cell 22 is insertable into each cell panel opening 26 which includes an opening flange 30. The PHX cell 22 is then secured to the cell panel 24 by crimping the cell outlet 28 to the opening flange 30.

Figure 3:
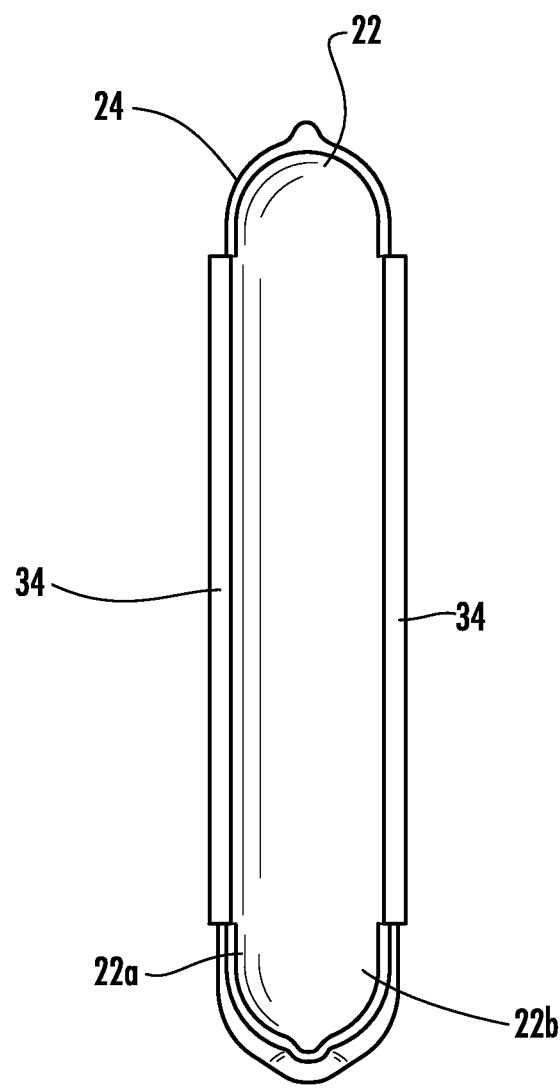
FIG. 3 is an end view of an embodiment of a heat exchanger cell outlet.
Figure 4:
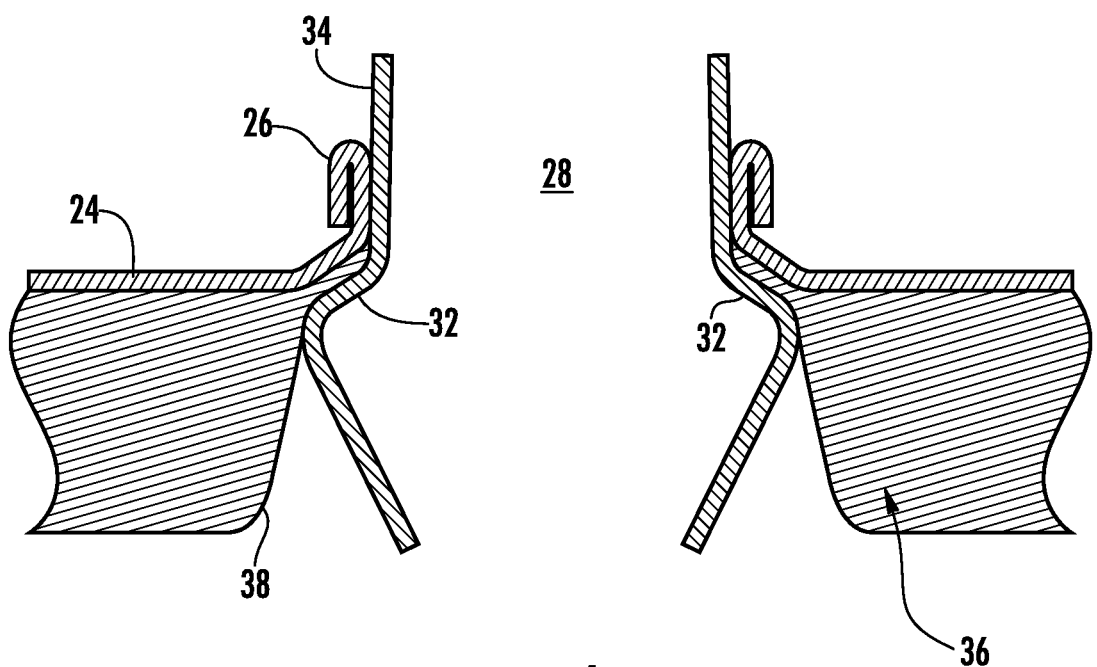
FIG. 4 is a cross-sectional view of an embodiment of a cell outlet inserted in a cell panel.

Shown in FIG. 3, each PHX cell 22 is formed in halves 22a and 22b by, for example, stamping, or other suitable process. The halves 22a and 22b are secured together to form a PHX cell 22 by, for example, welding. Referring to FIG. 4, the PHX cell 22 includes a beveled transition 32 around a circumference of the cell outlet 28 and a crimping flange 34 on each lateral side of the PHX cell 22. A bend angle between the crimping flange 34 of the cell outlet 28 extending through the cell panel opening 26 and the beveled transition 32 is less than approximately 90 degrees.

To improve sealing between the PHX cell 22 and the cell panel 24, a compressible gasket 36 is placed over the PHX cells 22, the gasket 36 includes gasket openings 38 to allow the cell outlets 28 to pass through. The cell panel 24 is placed over the PHX cells 22 and the gasket 36 such that the gasket 36 is retained between the beveled transitions 32 of the PHX cells 22 and the cell panel 24. The crimping flanges 34 are then bent over the opening flanges 30 to secure the PHX cells 22 to the cell panel 24 and to improve the sealing of the gasket 36 between the PHX cells 22 and the cell panel 24. Including the gasket 26 in the assembly of the PHX cell 22 to the cell panel 24 improves sealing between the two components and prevents leakage therethrough.

Figure 5:
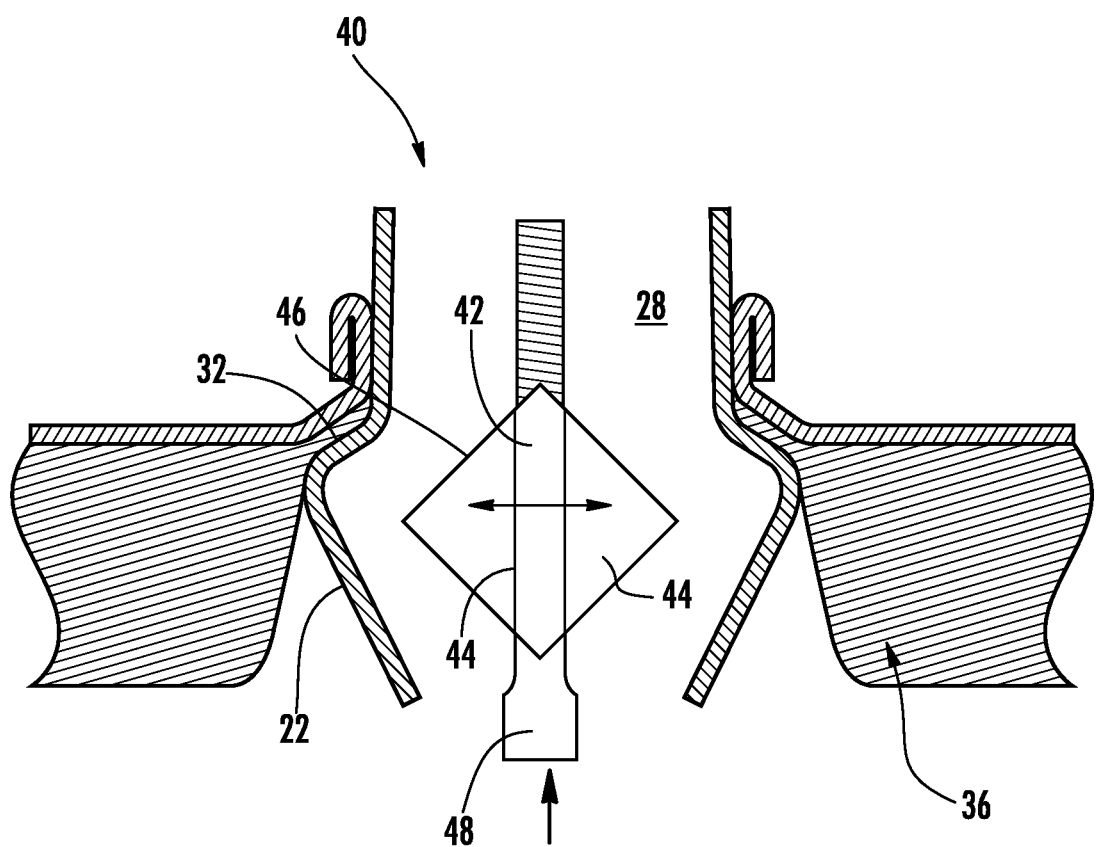
FIG. 5 is a cross-sectional view of an embodiment of a crimping tool inserted into a heat exchanger cell outlet.
Figure 6:
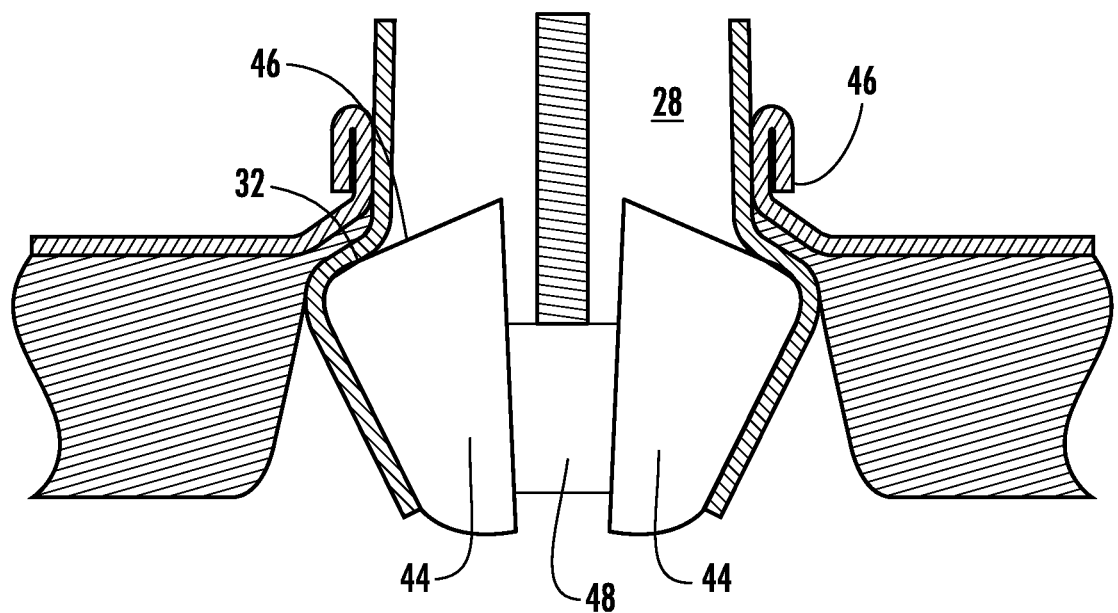
FIG. 6 is a cross-sectional view of an embodiment of a crimping tool expanded in a heat exchanger cell outlet.
Figure 7:
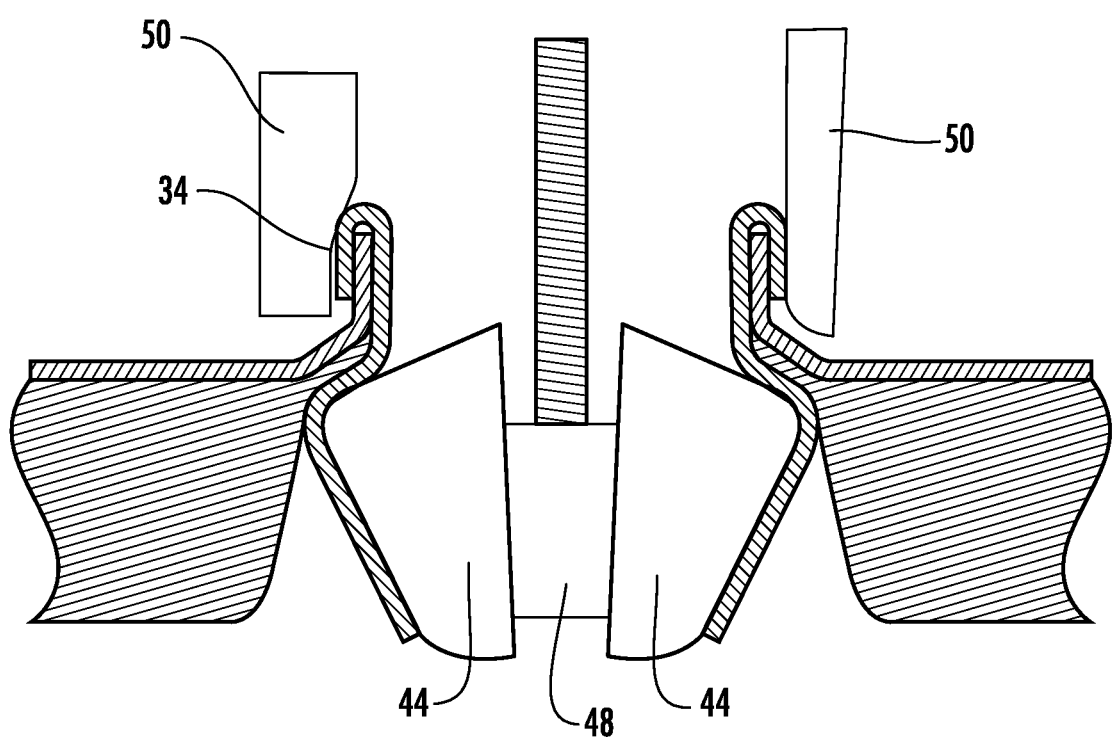
FIG. 7 is a cross-sectional view of an embodiment of a crimping tool after completing a crimp operation.

Referring now to FIG. 5, a crimping tool 40 is utilized to secure the PHX cells 22 to the cell panel 24. The crimping tool 40 includes a male portion 42 insertable into the cell outlet 28. The male portion 42 includes a split die 44. Each half of the split die 44 has a die bevel 46 substantially matching the beveled transition 32 of the PHX cell 22. Referring now to FIG. 6, once the male portion 42 is inserted into the cell outlet 28, a die expander 48 is drawn outwardly toward the cell outlet 28 thereby forcing the halves of the split die 44 apart such that the die bevel 46 engages the beveled transition 34. This engagement provides backing support for the crimping process. As shown in FIG. 7, when the die bevel 46 is engaged with the beveled transition 32, a female portion 50 of the crimping tool 40 is lowered over the crimping flanges 34 causing the crimping flanges 34 to bend over the opening flanges 30 thus securing the PHX cell 22 to the cell panel 24 with the gasket 36 between. Once the crimp is complete, the expander 46 is moved inwardly into the PHX cell 22 and the die halves 44 return to their unexpanded position thus allowing the male portion 42 to be removed from the PHX cell 22. In some embodiments, the crimp operation as described above is performed in more than one step. For example, it may be done in two steps where in a first step, the female portion 50 engages the crimping flange 34 and bends the crimping flange 34 relative to the opening flange 30 approximately ninety degrees. The die halves 44 are unexpanded allowing for removal to the crimping tool 40. In the second step, a second male portion 42 substantially similar to that described above is inserted into the cell outlet 28 and the dies halves 44 expanded to engage the beveled transition 32. A second female portion 50 is lowered to engage the crimping flanges 34 and complete the crimp. It is to be appreciated that the two-step process described herein is merely exemplary, and other multiple-step crimp processes are contemplated within the scope of the present disclosure. Providing the die bevel 46 on the split die 44 provides back up for the crimping operation without which the crimping process would collapse the crimping flanges 34 and/or the opening flanges 30. Further, use of the expandable split die 44 allows for the crimping operation to be accomplished from one side of the assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An attachment between a heat exchanger and a cell panel of a furnace comprising:
    a cell panel including a plurality of cell panel openings;
    a heat exchanger having a plurality of cells, each cell having a cell outlet insertable into a cell panel opening of the plurality of cell panel openings, the cell outlet having opposing linear lateral sides and curvilinear ends connecting the linear lateral sides;
    a beveled transition disposed at each cell outlet extending around a perimeter thereof to improve sealing between the cell outlet and the cell panel, a bend angle between a lateral side flange of the cell outlet extending through the cell panel opening and the beveled transition less than approximately 90 degrees; and
    a compressible gasket insertable between the cell panel openings and the cell outlets and securable therein when the heat exchanger is secured to the cell panel thereby sealing between the heat exchanger and the cell panel.

2. The attachment of claim 1, wherein the cell outlets are crimped to the cell panel openings at each lateral side, the lateral side flange bent approximately 180 degrees during the crimping process.

3. The attachment of claim 2, wherein the gasket is compressed between the crimped cell outlets and cell panel openings.

4. The attachment of claim 1, wherein the gasket includes a plurality of gasket openings, each gasket opening configured to allow a cell outlet to be inserted therethrough.

5. The attachment of claim 1, wherein at least one cell of the plurality of cells is formed in halves secured to each other.

* * * * *